H. RUSSAK & OTFRID v. HANSTEIN.
METHOD OF RENDERING SCRATCHES ON CINEMATOGRAPH FILMS INVISIBLE.
APPLICATION FILED FEB. 12, 1915.
1,208,664. Patented Dec. 12, 1916.
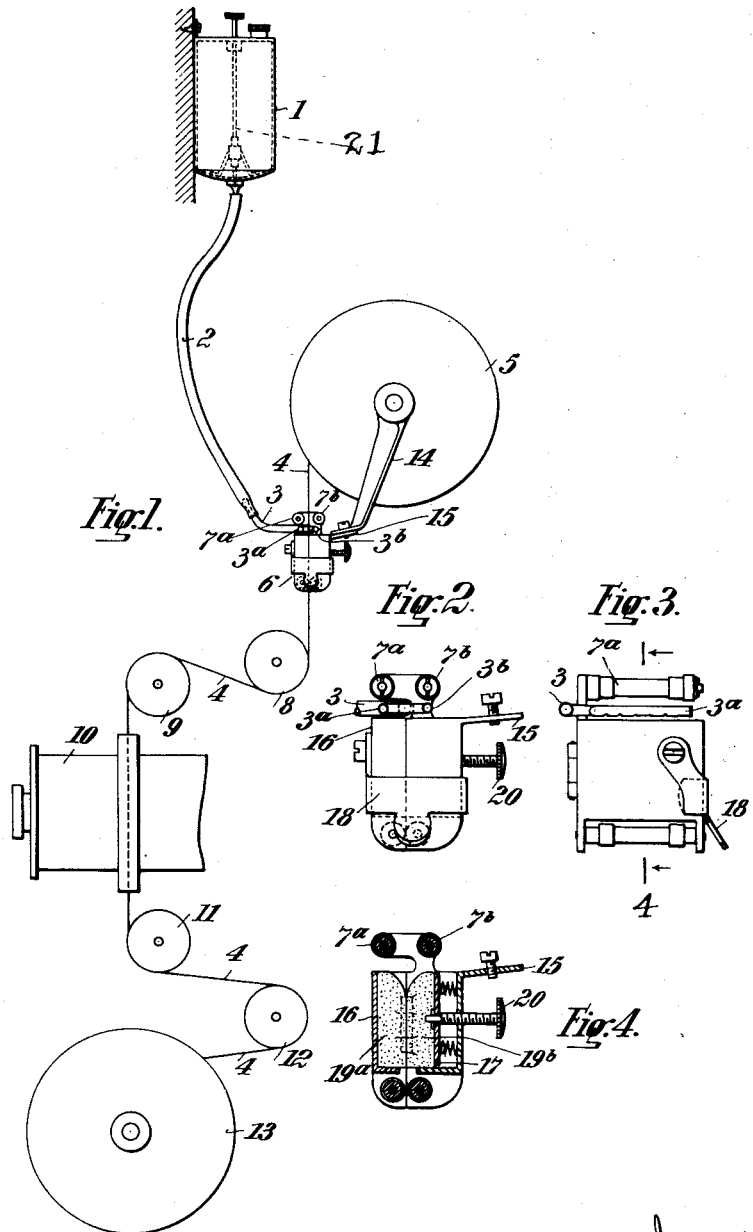

UNITED STATES PATENT OFFICE.

HUGO RUSSAK AND OTFRID v. HANSTEIN, OF BERLIN-SCHÖNEBERG, GERMANY; SAID VON HANSTEIN ASSIGNOR TO SAID RUSSAK.

METHOD OF RENDERING SCRATCHES ON CINEMATOGRAPH-FILMS INVISIBLE.

1,208,664.      Specification of Letters Patent.      Patented Dec. 12, 1916.

Application filed February 12, 1915. Serial No. 7,892.

*To all whom it may concern:*

Be it known that we, HUGO RUSSAK and OTFRID v. HANSTEIN, residing at 11/12 Nollendorfstrasse, Berlin-Schöneberg, Germany, have invented certain new and useful Improvements in Methods of Rendering Scratches on Cinematograph-Films Invisible, of which the following is a specification.

The present invention relates to a process and means for rendering entirely or practically invisible, during exhibition, the longitudinal scratches or striæ on cinematograph films. Hitherto various means have been proposed for attaining this object and satisfactory results from a technical point of view have been obtained with fatty oils. There are certain objections to the use of this means, for films which have been treated for some time with fatty substances gradually become dusty and greasy so that they have to be repeatedly cleaned and when sticky substances such as these are used the roller mechanism sometimes refuses to operate. In particular the objection has been noticed that fatty oil particles or constituents remain behind on the film and leave dark spots which considerably interfere with the projection of the picture.

According to the present invention the scratches or marks on the film are rendered entirely or practically invisible during the exhibition of the film by damping the film during operation with a fluid which easily evaporates and which has an index of refraction nearly the same as that of the film body.

The object of selecting a fluid which easily evaporates is to insure that after a film has been exhibited and at any rate when it is being wound up on the receiving roller no residue is left behind on the film.

By the selection of a fluid which has an index of refraction the same as that of the body of the film the scratches are made entirely or practically invisible by optical means. At the same time the picture is rendered clearer so that a considerable saving in the expenditure on light can be effected.

A further advantage which is attained according to the present invention is that friction between the parts which advance the film in the projecting apparatus and the film itself is reduced so that considerably less injury is done to the film. In this manner the present invention not only serves to clear the film of scratches during exhibition but also to protect new films from being scratched when they are exhibited and to keep them as long as possible in their original perfection.

Particularly effective means according to the present invention having an index of refraction nearly the same as that of the body of the film are found in halogenized hydrocarbons and in particular carbon tetrachlorid. These are non-inflammable and incombustible.

The process can be carried into effect as follows: The films are moistened with halogenized hydrocarbons before passing the projection aperture of the apparatus. To this end strips of felt are arranged in an easily accessible box or casing and are saturated with halogenized hydrocarbons. The film is then led between the strips of felt.

Any suitable apparatus may be used to carry out the method above described; the apparatus which we prefer being illustrated in the accompanying drawing, wherein—

Figure 1 is a side elevational view of such apparatus, illustrating the treatment of a film during its passage to the projecting machine; Fig. 2 is a similar view of the moistener proper; Fig. 3 is a view at right angles to Fig. 2; and Fig. 4 is a vertical sectional view on the line 4 of Fig. 3.

Referring to the drawing, 1 denotes the container for the halogenized hydrocarbon with which the film is moistened. Depending from the base of the container 1 is a flexible tube 2, terminating in a metal nipple 3, provided with the branch pipes $3^a$ and $3^b$.

The film 4 is wound on the reel 5, and passes from the latter in a substantially vertical line between guide rollers $7^a$ and $7^b$ through the moistener 6. From the moistener, the film 4 is carried over guide rollers 8 and 9 through the projecting apparatus 10, thence over the guide rollers 11 and 12 to the wind-on reel 13.

The moistener 6 may be supported in any suitable manner, as by having a bracket 15 thereon secured to an arm 14 carried by the wind-off reel 5. As will clearly appear from Fig. 4, the moistener comprises a pair of oppositely disposed jaws or plates 16 and 17, held together by means of a clamp 18. The jaws embrace a pair of felt pads or cushions, 19ª and 19ᵇ, between which the film 4 is caused to pass. The pads serve to moisten the film, and the distance between the operative faces of the pads may be varied by means of the adjusting screw 20.

The solution to be used is placed in the container 1, and its outflow therefrom may be regulated by means of a needle-valve 21, or the like. From the container 1 the liquid flows through the pipe 2, the nipple 3 and the branch pipes 3ª and 3ᵇ, the latter being perforated and extending lengthwise over the tops of the pads 19ª and 19ᵇ. In this manner the pads are moistened and give off their moisture to the film 4 in its passage from the wind-off reel, through the projecting apparatus, to the wind-on reel.

The result actually accomplished by the practice of our method, is the production of an optical illusion, in that the scratches on the film are made to appear, during projection, like the intact part of the film; this being due to the fact that the liquid with which we treat the film before it passes the projection opening of the projecting apparatus has substantially the same index of refraction as the body of the film.

Having now particularly described and ascertained the nature of our said invention and in what manner the same is to be performed, we declare that what we claim is:—

1. The herein described method of rendering scratches on cinematographic films temporarily invisible by optical illusion, which consists in applying to such film, before it passes the projection opening of the projecting apparatus, a readily vaporizable liquid having substantially the same index of refraction as the film.

2. The herein described method of rendering scratches on cinematographic films temporarily invisible by optical illusion, which consists in applying to such film, before it passes the projection opening of the projecting apparatus, a readily vaporizable and non-inflammable liquid having substantially the same index of refraction as the film.

3. The herein described method of rendering scratches on cinematographic films temporarily invisible by optical illusion, which consists in applying to such film before it passes the projection opening of the projecting apparatus, a liquid containing readily vaporizable halogenized hydrocarbon having substantially the same index of refraction as the film.

4. The herein described method of rendering scratches on cinematographic films temporarily invisible by optical illusion, which consists in applying to such film before it passes the projection opening of the projecting apparatus, a substance containing tetrachloride of carbon, and having substantially the same index of refraction as the film.

In testimony whereof we affix our signatures in presence of two witnesses.

Dr. HUGO RUSSAK.
OTFRID v. HANSTEIN.

Witnesses:
 WOLDEMAR HAUPT,
 HENRY HASPER.